(No Model.)

G. A. KEENE.
HORSE HOOF MOISTENER.

No. 262,186. Patented Aug. 1, 1882.

Witnesses.
Geo. W. Downing
S. Ruth

Inventor.
George A. Keene
by C. B. Tuttle
Att'y.

United States Patent Office.

GEORGE A. KEENE, OF LYNN, MASSACHUSETTS, ASSIGNOR OF ONE-HALF TO SAWYER & CHASE, OF SAME PLACE.

HORSE-HOOF MOISTENER.

SPECIFICATION forming part of Letters Patent No. 262,186, dated August 1, 1882.

Application filed May 29, 1882. (No model.)

*To all whom it may concern:*

Be it known that I, GEORGE AUGUSTUS KEENE, of Lynn, in the county of Essex and Commonwealth of Massachusetts, have invented certain new and useful Improvements in Devices for Keeping Horses' Hoofs Moist and Cool, of which the following, taken in connection with the accompanying drawings, is a specification.

This invention relates to a device for keeping horses' hoofs cool and moist by holding a moistened sponge or other cooling fibrous substance in contact with the bottom part thereof, and has for its object to provide a device for holding the sponge or other packing in place in the hoof, which device shall be readily and easily combined with or detached from the foot to permit the introduction or removal of the sponge, and which shall permit of ready adjustment to hoofs of different sizes.

Figure 1:
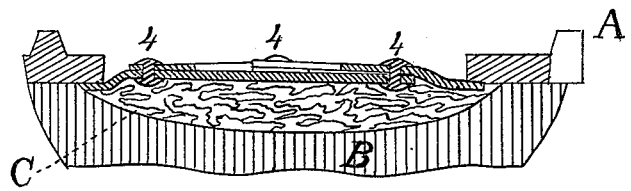
Figure 2:
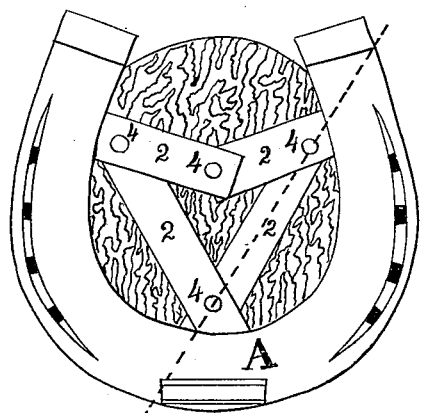
Figure 3:
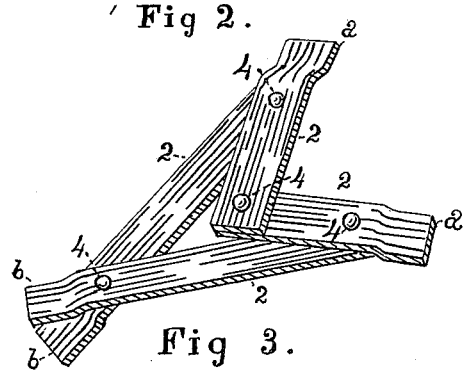

Figure 2 of the accompanying drawings is a bottom view of a horse's hoof having my invention applied thereto. Fig. 1 is a longitudinal section of the same. Fig. 3 is a perspective view of the holding device detached.

Said holding device is composed of a series of spring-levers, 2, arranged to overlap each other, as shown in Fig. 3, and tightly jointed together by rivets 4. It is preferably composed of brass, in order to avoid rust, the levers 2 being made of thin plate metal and drawn closely together by the rivets 4, which should also be made of brass or other metal not easily affected by moisture and rust. The levers 2 are constructed of spring metal, in order that when subjected to pressure (as when the horse is standing on gravel or small stones) it may yield sufficiently to avoid being bent out of shape. It also retains its place in the hoof better by being thus adapted to spring. The outer ends, *a a* and *b b*, of the levers are bent slightly, as shown in Fig. 3.

The shoe A is constructed and fastened to the hoof B in the usual and customary manner. After the sponge C is placed in position in the hoof under the frog, the ends *b b* of the holding device are inserted at the toe between the shoe and the hoof, whereupon the levers 2 are opened outward till the ends *a a* pass in between the shoe and the hoof at the sides, as shown, in which position it holds the sponge up against the bottom of the foot. The parts *a a* and *b b* of the holder, being bent, as shown, operate to remove the holder away from the bottom of the foot, and thereby permit the introduction of a greater quantity of sponge or cooling material, which material, pressing outward against the holder, tends thereby to increase the grip of the rivets 4, and this, together with the portions of material that project out through the openings between the levers, is amply sufficient to keep the holder from working out of place in the hoof.

It will be evident from the foregoing that the holder is not confined in its operation to the use of a sponge, but is equally applicable for holding any flexible fibrous packing in contact with the hoof, as shown.

I am aware that a pad has been held in a horseshoe by a broad central plate having short arms pivoted to it, such arms fitting under the shoe, and I desire to disclaim the same, my invention being limited to specific improvements; and, therefore,

What I claim, and desire to secure by Letters Patent, is—

The combination, with a horseshoe, of a sponge or pad, and a holding device composed of the flat elastic overlapping plates 2 2 2 2, pivoted together and adapted to rest on said shoe, all substantially as described.

In testimony whereof I have signed this specification in the presence of two witnesses.

GEO. A. KEENE.

Witnesses:
C. B. TUTTLE,
J. H. J. SAWYER.